Patented July 5, 1927.

1,634,336

UNITED STATES PATENT OFFICE.

CLAYTON OLIN NORTH, OF AKRON, OHIO, ASSIGNOR TO THE RUBBER SERVICE LABORATORIES COMPANY, OF AKRON, OHIO, A CORPORATION OF OHIO.

RUBBER-VULCANIZATION PROCESS.

No Drawing.   Application filed August 27, 1926.   Serial No. 132,041.

My present invention is directed to the manufacture of vulcanized rubber by a process wherein there is employed as an accelerator of the vulcanization step, a new compound capable of causing the vulcanization process to be completed in a relatively short period of time and of imparting highly desirable and commercially important characteristics to the vulcanized product.

The reaction product of an aliphatic aldehyde with an aromatic primary amine has previously been described as a rubber vulcanization accelerator by Bastide in French Patent No. 470,883; by Peachey in British Patent No. 7,370 of 1914, and by Cadwell in United States Patent No. 1,417,970. All of the patents just mentioned, however, disclose as accelerators only those compounds formed by the interaction of equi-molecular proportions of the ingredients employed in their manufacture. In a Patent No. 1,467,984, issued to me September 11, 1923, I have shown that an aliphatic aldehyde will combine with an aromatic primary amine in other than equi-molecular proportions. Such compounds I have termed the aldehyde derivatives of a Schiff's base, and I have shown that these compounds as a class comprise particularly valuable rubber vulcanization accelerators and in the patent referred to have claimed their use in such a process.

The present application is an improvement of the process claimed in my earlier patent and comprises particularly the use as a vulcanization accelerator of the heptaldehyde derivative of the reaction product of an aromatic primary amine such as aniline with an unsaturated aliphatic aldehyde as acrolein. Preferably, the accelerator comprises the compound resulting from the use of equi-molecular proportions of the materials mentioned, although departures may be made from the proportions particularly set forth if desired.

One procedure whereby the desired accelerator may be obtained is as follows: One molecular proportion (93 parts) of aniline is mixed in a container with one molecular proportion (56 parts) of acrolein. Suitable agitating means are preferably provided to constantly maintain the reacting materials in a homogeneous condition and cooling means of any well known type are also provided sufficient to maintain the temperature of the mass at all times below the boiling point of all of the components present. The mass is permitted to remain under the conditions as described until all reaction between the materials present has substantially ceased, which point can be readily recognized by the disappearance of the characteristic odor of the aldehyde employed. Thereupon, there is added to the reaction product formed, one molecular proportion (112 parts) of heptaldehyde, and the entire mass is gently refluxed at any desirable temperature for several hours. The refluxing temperature may vary between relatively wide limits but for most purposes, a temperature of from 70 to 90° C. maintained for approximately twenty-four hours, is sufficient to cause substantially complete combination of the ingredients to take place. The refluxing period may be somewhat lessened if the heating be carried out under the pressure of evolved vapors in an autoclave at a temperature of approximately 125° C. Slight traces of an acid, such as butyric or undecylinic acid catalyzes the reaction.

When the refluxing period is completed, the water of condensation present, which in the case of the example set forth, comprises approximately two molecular proportions, is separated from the final reaction product, which is a liquid, and this product is then subjected to steam distillation to remove traces of any of the components which may have failed to react and to purify the reaction product. Water remaining in the product may then be separated therefrom in any suitable manner and the final liquid product is then ready for incorporation into a rubber mix to be employed therein as a vulcanization accelerator.

For this purpose, a rubber mix comprising 100 parts of rubber, for example pale crepe rubber, 5 parts of zinc oxide and 3.5 parts of sulfur is prepared in the well known manner and to this mix 0.4 parts of the heptaldehyde derivative of the reaction product of aniline and acrolein is incorporated therein. The resulting rubber compound is then vulcanized by heating for approximately thirty minutes in a press at the temperature given by 40 pounds of steam pressure per square inch whereupon there results a vulcanized product which upon testing, is found to possess a modulus load at 500% elongation of 599 pounds per square inch, a tensile strength at break of 3910 pounds per square inch and an ultimate elongation of 815%. If the same compound is heated under similar temperature conditions for approximately forty-five minutes and then tested, it is found that the vulcanized product possesses a modulus at 500% elongation of 621 pounds per square inch, a tensile strength at break of 3860 pounds per square inch and an ultimate elongation of 790%. Obviously, a vulcanized rubber product of high quality results from heating the compounds specified for from thirty to forty-five minutes under the temperature conditions set forth.

An excellent hard rubber compound results upon heating for approximately one hour and forty-five minutes at the temperature given by 40 pounds of steam pressure per square inch, a rubber mix prepared in the usual manner and comprising 40 parts of pale crepe rubber, 5 parts of lime, 15 parts of zinc oxide, 25 parts of sulfur, 10 parts of mineral rubber and 2 parts of the accelerator, that is, the heptaldehyde derivative of an acrolein-aniline reaction product.

Another example of the many possible uses of my preferred type of accelerator is shown by the following composition which is typical of a compound used for the manufacture of a tire tread stock. Such a compound comprises 51 parts of smoked sheet rubber, 19 parts of carbon black, 20.5 parts of zinc oxide, 3.5 parts of mineral rubber, 1 part of "cycline" oil (a commercial softener comprising a blended mineral and vegetable oil), 2.25 parts of sulfur and 1 part of the heptaldehyde derivative of the acrolein-aniline reaction product. The rubber compound is vulcanized in the usual manner by heating in a press for approximately one hour at the temperature given by 40 pounds of steam pressure per square inch, and upon testing is found to possess a modulus of 3095 pounds per square inch at 500% elongation, a tensile strength at break of 4018 pounds per square inch and an ultimate elongation of 610%. Other examples illustrating the use of the compound hereinbefore set forth could be given but the examples described are sufficient to illustrate the value and applicability as a vulcanization accelerator of the compound particularly described.

It is, of course, not necessary to manufacture the heptaldehyde derivative of the reaction product of acrolein-aniline by the process particularly described but departures may, if desired, be made from this process or the product may be obtained by means of an entirely different process. My invention is to be understood as limited only by the following claims in which I intend to claim as an accelerator a compound resulting from the action of heptaldehyde upon the reaction product of acrolein and aniline. Preferably, the accelerator comprises the compound obtained by the interaction of equi-molecular proportions of the ingredients mentioned but variations in these proportions may be made if desired, and it is my intention to claim the use in the rubber vulcanization process of such accelerators as may thereby result.

What I claim is:

1. The process of vulcanizing rubber which comprises heating a rubber compound containing sulfur in the presence of the heptaldehyde derivative of an aniline-acrolein reaction product.

2. The process of vulcanizing rubber which comprises heating a rubber compound containing sulfur in the presence of the compound resulting from the treatment of the reaction product of equi-molecular proportions of aniline and acrolein with an equi-molecular proportion of heptaldehyde.

3. The process of vulcanizing rubber which comprises heating a rubber compound containing sulfur in the presence of the compound resulting from the treatment of the reaction product of one molecular proportion of acrolein and one molecular proportion of aniline with one molecular proportion of heptaldehyde.

4. The process of vulcanizing rubber which comprises heating a mixture of rubber and sulfur in the presence of the compound resulting from the treatment of the reaction product of 56 parts by weight of acrolein and 93 parts by weight of aniline with substantially 112 parts by weight of heptaldehyde.

5. The vulcanized rubber product obtained by heating a rubber compound containing sulfur in the presence of the heptaldehyde derivative of an acrolein-amine reaction product.

6. The vulcanized rubber product obtained by heating a rubber compound containing sulfur in the presence of an accelerator obtained by reacting one molecular portion of heptaldehyde with the reaction product of equi-molecular proportions of acrolein and aniline.

In testimony whereof I affix my signature.

CLAYTON OLIN NORTH.